United States Patent [19]

Barmatz et al.

[11] Patent Number: 4,964,303

[45] Date of Patent: Oct. 23, 1990

[54] ACOUSTIC POSITIONING AND ORIENTATION PREDICTION

[75] Inventors: Martin B. Barmatz, Glendale; Glenn Aveni, Sunland; Seth Putterman, Sherman Oaks; Joseph Rudnick, Los Angeles, all of Calif.

[73] Assignee: The United States of America as represented by the Administrator of the National Aeronautics and Space Administration, Washington, D.C.

[21] Appl. No.: 271,265

[22] Filed: Nov. 15, 1988

[51] Int. Cl.[5] ............ G01K 15/00

[52] U.S. Cl. ............ 73/505

[58] Field of Search ............ 73/505

[56] References Cited

U.S. PATENT DOCUMENTS

| | | | |
|---|---|---|---|
| 4,139,806 | 2/1979 | Kanber et al. | 73/505 X |
| 4,463,606 | 8/1984 | Barmatz | 73/505 |
| 4,520,656 | 6/1985 | Barmatz | 73/505 |
| 4,777,823 | 10/1988 | Barmatz et al. | 73/505 |
| 4,800,756 | 1/1989 | Barmatz et al. | 73/505 |

OTHER PUBLICATIONS

E. Leung et al., "Resonance Frequency Shift of an Acoustic Chamber Containing a Rigid Sphere," *J. Acoust. Soc. Am.* 72 (2), Aug. 1982, pp. 615–620.

Morse, *Vibration and Sound*, (McGraw Hill, N.Y., 1948) pp. 389–401.

Oran, W. A., et al., "Parametric Study of an Acoustic Levitation System", Rev. Sci. Instrum., vol. 51, No. 5, May 1980.

*Primary Examiner*—John Chapman

*Attorney, Agent, or Firm*—Thomas H. Jones; John R. Manning

[57] ABSTRACT

A method for use with an acoustic positioner, which enables a determination of the equilibrium position and orientation which an object assumes in a zero gravity environment, as well as restoring forces and torques on the object, of an object of arbitrary shape in a chamber of arbitrary configuration. An acoustic standing wave field is established in the chamber, and the object is held at several different positions near the expected equilibrium position. While the object is held at each position, the center resonant frequency of the chamber is determined, by noting which frequency results in the greatest pressure of the acoustic field. The object position which results in the lowest center resonant frequency, is the equilibrium position. The orientation of a nonspherical object is similarly determined, by holding the object in a plurality of different orientations at its equilibrium position, and noting the center resonant frequency for each orientation. The orientation which results in the lowest center resonant frequency is the equilibrium orientation. Where the acoustic frequency is constant but the chamber length is variable, the equilibrium position or orientation is that which results in the greatest chamber length at the center resonant frequency.

20 Claims, 3 Drawing Sheets

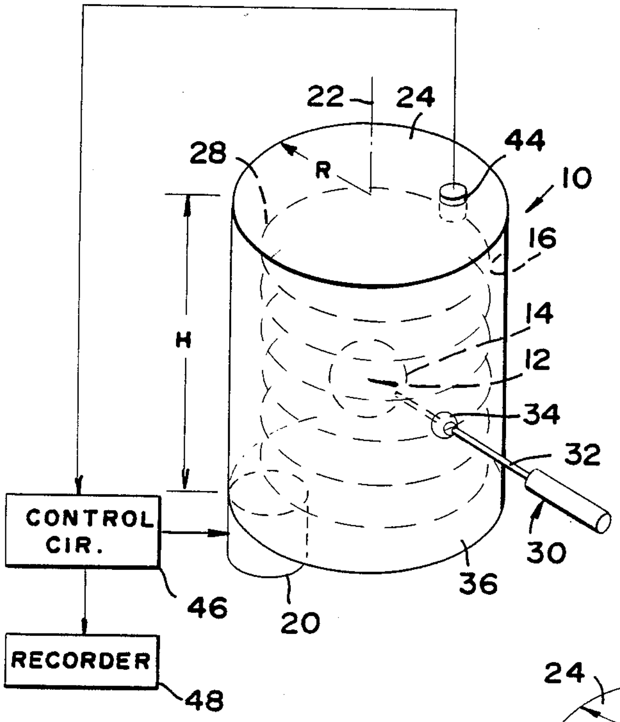
FIG. 1
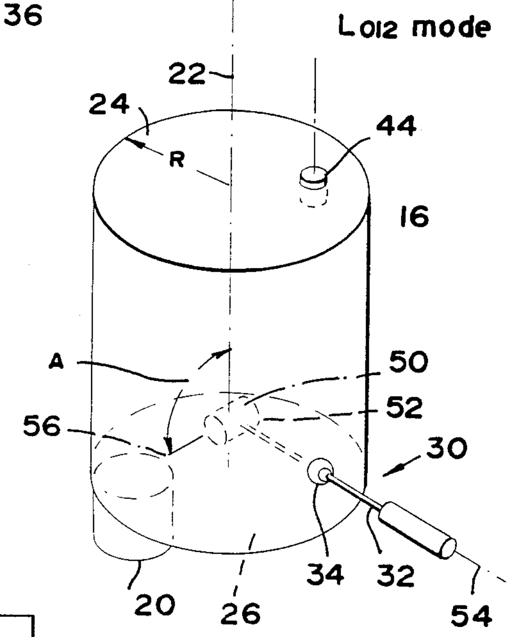
FIG. 2
FIG. 1A
| POSITION | CENTER RES. FREQ. |
|---|---|
| 1 | 1020 Hz |
| 2 | 1016 Hz |
| 3 | 1012 Hz |
| 4 | 1014 Hz |
| 5 | 1018 Hz |
40
42

FIG. 5
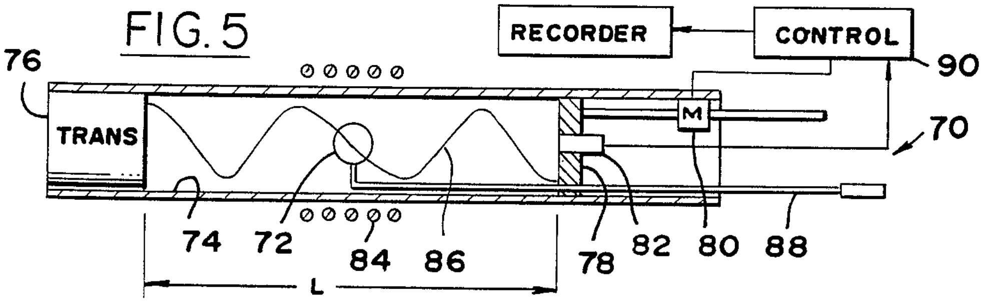
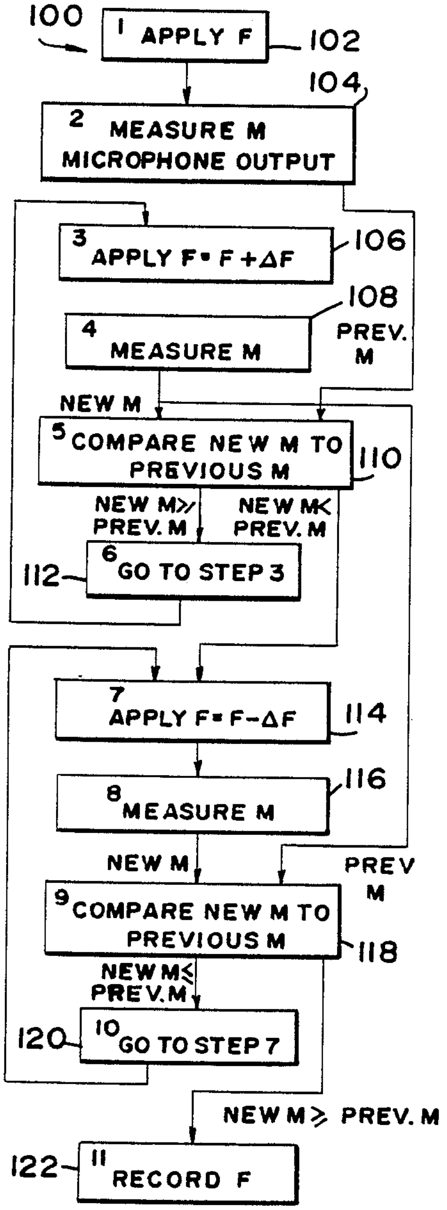
FIG. 6
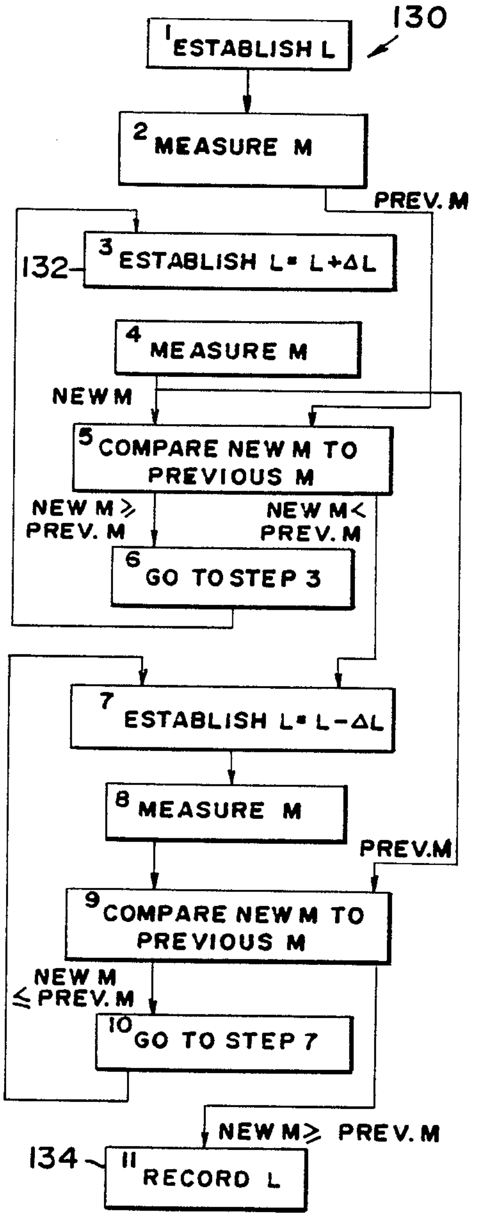
FIG. 7

ACOUSTIC POSITIONING AND ORIENTATION PREDICTION

ORIGIN OF THE INVENTION

The invention described herein was made in the performance of work under a NASA contract, and is subject to the provisions of Public Law 96-517 (36 USC 202) in which the Contractor has elected not to retain title.

TECHNICAL FIELD

This invention relates to acoustic positioning.

BACKGROUND ART

Acoustic positioners, which use acoustic standing wave fields to hold, position or levitate, an object in a chamber away from the chamber walls, is especially useful in the microgravity environment of an outerspace vehicle. In such an environment, the small positioning force of an acoustic field is sufficient to hold the object in position. Under simple but unrealistic conditions, where a spherical object of any size lies in a spherical chamber, or a very small (compared to the chambers) spherical object lies in a chamber of simple geometric shape (which is either a rectangle, cylinder, or sphere), and the gas or other fluid in the chamber is of a uniform moderate temperature, formulas can be developed for estimating the equilibrium position of the object. However, it is difficult or impossible to predict the precise equilibrium position or restoring forces on the object in realistic situations where the conditions are complex, as where the chamber shape and the object shape, size and composition are arbitrary, and where there is a large temperature gradient in the fluid within the chamber. Furthermore, formulas are not available for predicting the orientation of nonspherical objects in a given acoustic standing wave field.

One important application of acoustic positioning is to enable melting of an object of high temperature-melting materials, (at least about 1500° C.) while positioning the object away from the walls of a crucible that could contaminate the molten object. Since positioning forces are low, it is difficult to perform experiments in Earth gravity that will indicate the position and orientation of the molten object. Because of large temperature gradients in the gas within the chamber, it is difficult to determine the position and orientation of the molten object in a microgravity environment. A method and apparatus which enabled accurate prediction of the equilibrium and/or orientation of an acoustically positioned object in a microgravity, environment, as well as prediction of restoring forces and torques, during experimentation in a one G (Earth gravity) environment, would be of considerable value.

STATEMENT OF THE INVENTION

In accordance with one embodiment of the present invention, a method and apparatus are provided that enable prediction of the equilibrium position and/or orientation, as well as restoring forces and torques, of an object in an acoustic standing wave field in a zero gravity environment. An acoustic standing wave field of a given mode is applied to a chamber which has at least two opposite walls, and the object is positioned in a plurality of different positions in the standing wave field. At each position of the object, the center resonant frequency of the acoustic mode is determined, that being the frequency of a transducer of constant energy output which results in an acoustic field of highest intensity. That object position which results in the lowest center resonant frequency, is the position at which the object will be levitated in a zero environment.

The orientation that the object will assume at its equilibrium position, in a zero gravity environment, is obtained in a similar way. The object is positioned in a plurality of different orientations, and the center resonant frequency for each orientation is determined. That orientation which results in the lowest center resonant frequency, is the orientation that the object will assume in a zero gravity environment. The force and torque urging the object towards the equilibrium position and orientation can be determined by determining the derivative of change in center resonant frequency with change in object position or orientation.

In a system where the acoustic energy is of constant frequency, but the length of a dimension of the chamber is variable, the levitation position is determined by establishing the object at a plurality of different positions. At each object position the resulting center resonant chamber length is determined, that being the length which results in greatest acoustic field intensity. That object position which results in the longest center resonant length of the chamber, is the equilibrium position of the object in a zero gravity environment. Similarly, the orientation of an object is determined by establishing the object in different orientations, determining the center resonant length of the chamber for each orientation, and noting that the orientation of the object which results in the longest center resonant length is the orientation the object will assume in a zero gravity environment.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of an acoustic positioning system constructed in accordance with one embodiment of the present invention.

FIG. 1A is a simplified chart showing change in center resonant frequency in FIG. 1 with change in object position.

FIG. 2 is a view similar to that of FIG. 1, but with the chamber driven in a different mode, and being used to determine the levitation orientation of an object.

FIG. 5 is a sectional side view of a system of another embodiment of the invention, for determining the levitation position of an object in a chamber of variable length.

FIG. 6 is a flow chart showing the manner of operation of the control of the apparatus of FIG. 1.

FIG. 7 is a flow chart showing the manner of operation of the control of the system of FIG. 5.

DESCRIPTION OF THE PREFERRED EMBODIMENTS

Figure 1B:
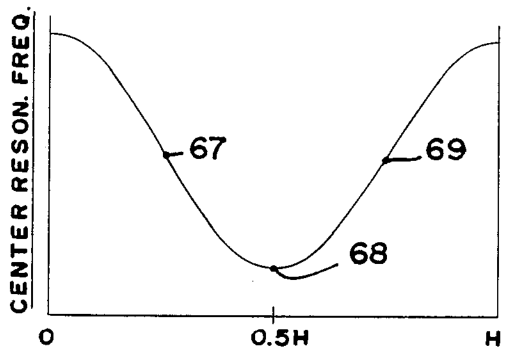
FIG. 1B is a graph showing variation of center resonant frequency with object position.

FIG. 1 illustrates an apparatus 10 for determining the levitation position 12 that an object 14 will assume within a chamber 16, when an acoustic standing wave field of given mode is applied to the chamber. An acoustic transducer 20 is energized at a frequency which produces an acoustic standing wave field in the chamber. In a cylindrical chamber of height H and radius R the object can be levitated along the axis 22 of the chamber about halfway between the opposite end walls 24, 26 of the chamber by a limited number of modes. For example, the transducer can be driven at a frequency whose wavelength equals 2H to hold the object halfway between the end walls 24, 26. It is noted that in a simple plane wave field, such as where only the wavelength 2H is present, the position of the object is only known to be somewhere on a plane, but the object location on that plane is not known. Here, the transducer is also being driven to produce a wavelength equal to 1.64R to hold the object along the axis 22 of the chamber. In a single levitation mode that is described in U.S. Pat. No. 4,573,356, the transducer can be driven at a single frequency which holds the object at the position 12. The actual system may cause the levitation position to deviate from the calculated one, as where a heating coil 28 is used to heat the object or where other objects are placed in the chamber, or the chamber is not of a simple geometric shape, or the object is large compared to the chamber volume. It is useful to know the levitation position of the object in the presence of all of these actual conditions, where the chamber contains a non-planar acoustic standing wave field (i.e. the field is not formed solely of a planar wave).

In order to determine the equilibrium position of the object, a positioning device 30 is provided which enables the object to be established at a plurality of different positions, which are in the vicinity of the theoretically predicted levitation position 12. In one example, the positioning device includes a rod 32 which passes through a hole in a ball and socket device 34 that is clamped to the outside of the walls 36 forming the chamber. The chamber is filled with a gas such as nitrogen at perhaps one atmosphere pressure.

With the object at a first of several positions, a determination is made of the central resonant frequency of the chamber for that object position for a selected mode. It is desirable to choose a particular mode which results in a desired equilibrium position, and calculate the approximate frequency or wavelength, since resonant modes are spaced far apart in frequency and each mode may result in a very different equilibrium position. The center resonant frequency, or resonant frequency, for a mode, is that frequency at which the intensity of the acoustic standing wave field in the chamber is a maximum for a given output of the transducer 20. For a chamber of fairly high Q such as 100, which can be achieved in practice, a deviation from the center resonant frequency of 0.5% results in the intensity of the acoustic field dropping to 50% of the value obtained at the center resonant frequency. Thus, for chambers of moderate to high Q, the center resonant frequency can be determined with high precision.

After the center resonant frequency is determined for the first position, the object is moved to another position near the calculated equilibrium position, and the center resonant frequency is again determined. After the center resonant frequency is determined for many positions near the expected equilibrium position, note is taken of the lowest center resonant frequency. The object's equilibrium position in a zero gravity environment will be at that position which results in the lowest center resonant frequency. FIG. 1A is a chart 40 which lists several object positions and the resulting center resonant frequency. It can be seen that at position 3 indicated at 42, the center resonant frequency is lowest. Thus, in a zero gravity or microgravity environment, the object will levitate, or be positioned at or close to the position 42. If greater precision is required, additional measurements of center resonant frequency can be taken near the position number 3.

In FIG. 1, a microphone 44 is provided to sense the intensity of the acoustic field in the chamber 16. The output of the microphone is delivered to a control circuit 46 which controls the frequency at which the transducer 20 is driven. Each time the object is moved to a new position, the control circuit varies the frequency at which the transducer 20 is driven and senses the output of the microphone 44 to determine which frequency resulted in the greatest microphone output. That frequency is the center resonant frequency for that object position. The power delivered to the transducer is kept constant, and the transducer is of a type whose acoustic output power does not change appreciably for small changes in frequency. After the control circuit 46 has determined the center resonant frequency of all predetermined positions, the position which resulted in the lowest resonant frequency is recorded by a recorder 48 (which may be done automatically or manually). The actual position of the object at the lowest center resonant frequency can be determined in a number of ways, as by direct measurement taken through a transparent chamber wall or by noting the angular orientation and depth of insertion of the object-holding rod 32.

The same approach used to determine the equilibrium position or location of the object, can be used to determine the orientation that an object will assume at the equilibrium position (this is meaningful only where the objects is not spherical). FIG. 2 shows the chamber 16 with the transducer 20 energized in an $L_{102}$ single frequency mode (given in U.S. Pat. No. 4,573,356), wherein the object is positioned near position 50 spaced from one of the end walls 24, 26 by ¼th the height H of the chamber. The object 52 is a cylinder having a length twice its diameter. Applicant known of no theories that will enable a prediction of the orientation of this or other nonspherical objects in an acoustic field.

Applicant orients the object 52 at a plurality of different orientations, and determines the center resonant frequency of the chamber at each of the orientations of the object. The center resonant frequency is determined by determining which frequency results in the most intense acoustic field as measured by the microphone 44, in a manner described in connection with FIG. 1. The microphone directly measures the pressure of the acoustic field at the location of the microphone, which is a measure of the intensity, or strength, of the field (intensity is proportional to the square of the pressure). It may be noted that in the mode $L_{012}$, the acoustic field is substantially symmetrical about the chamber axis 22, so that the approximate levitation orientation can be determined just by turning the rod 32 about its axis 54. A more precise determinaton of the equilibrium orientation can be obtained by turning the object about the chamber axis 22. Applicant has found that the equilibrium orientation of a cylindrical object is such that the axis 56 of the object is angled by an angle A of 90° from the axis 22 of the cylindrical chamber for the single transducer positioner mode $L_{012}$. To find both the equilibrium position and orientation for an object of given shape, applicant first determines the equilibrium position and then the equilibrium orientation at that position. With the object held in the equilibrium orientation, applicant can then move the object to several positions spaced slightly from the originally-determined levitation position, to determine whether maintaining the object in the equilibrium orientation slightly changes the measured equilibrium position.

Figure 3:
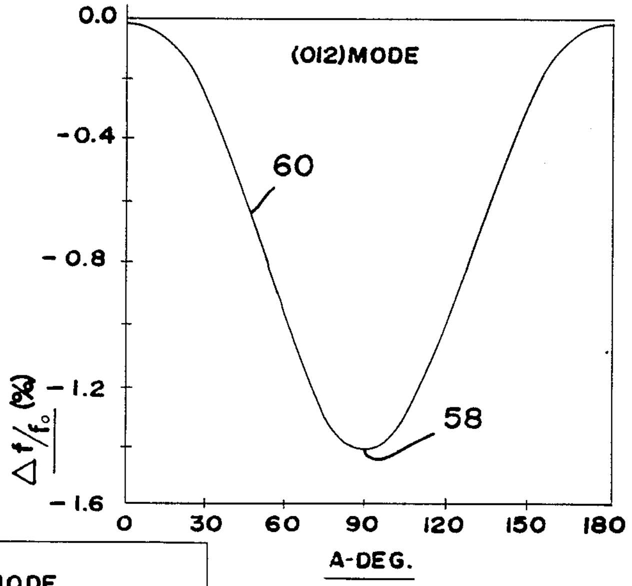
FIG. 3 is a graph showing the variation in frequency with angular orientation of the object in the apparatus of FIG. 2.

FIG. 3 is a graph 60 for the apparatus fo FIG. 2, showing the change in center resonant frequency that occurs as the object 52 is rotated 180°, with the object maintained in the equilibrium position. The change is denoted as Δf divided by the empty chamber resonant frequency $f_0$, while the angle A is as indicated in FIG. 2. It can be seen that the lowest center resonant frequency 58 occurs when the axis of the cylindrical object is oriented at an angle A of 90° from the axis of the chamber. The graph 60 can also be used to indicate how the torque urging the object towards the equilibrium orientation varies with the angular orientation of the object. The torque is proportional to the slope of the graph 60.

Figure 4:
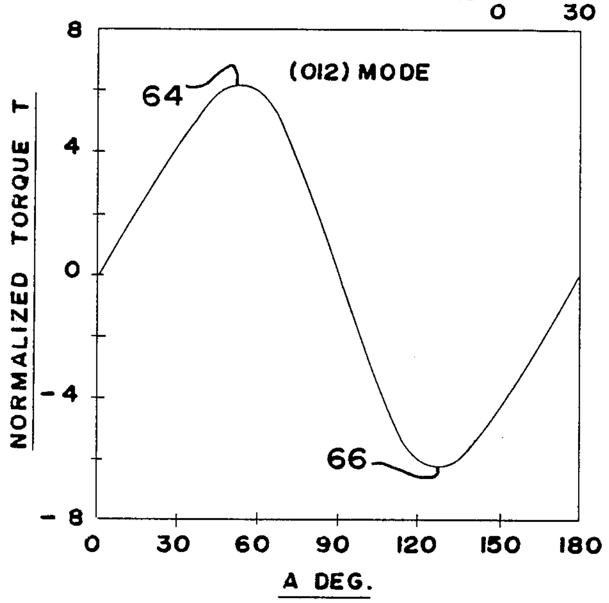
FIG. 4 is a graph showing the variation in torque with orientation applied by the acoustic field, which results from the graph of FIG. 3.

FIG. 4 is a graph 62 representing the derivative or slope of the graph 60 at different angular orientations A of the cylindrical object 52 as measured in an actual experiment. It can be seen that the torque urging the object towards its equilibrium orientation is zero at 90° and at 0° and at 180°. The torque is greatest at the points 64, 66 which are each angled about 37° away from the equilibrium orientation (90°). Thus, the measurement of variation in center resonant frequency with angular displacement from the equilibrium orientation, enables a determination of the relative torque at different orientations that urge the object toward the equilibrium orientation.

The same technique used for determining equilibrium orientation and torque can be used to determined the variation in force urging an object towards its equilibrium position, as a function of the deviation of the object from its equilibrium position. This is accomplished by noting the variation in center resonant frequency with deviation from the levitation position, and by determining the slope or derivative of that function to determine the relative force urging the object towards the equilibrium position. FIG. 1B shows variation in center resonant frequency with object position, for the theoretical situation in FIG. 1. It can be seen that at point 68, which is the equilibrium position, the slope of the graph is almost zero, so there is almost zero force urging the object towards the equilibrium position when it is very close to that position. The maximum force is at points 67, 69. The apparatus of FIG. 1 allows the determinations of equilibrium position and force with high precision for any arbitrary setup.

FIG. 5 illustrates an apparatus 70 of a type wherein the object 72 to be positioned lies in a chamber 74 of a variable dimension, such as of a variable length L. It is common in such a system, for the acoustic transducer 76 to generate acoustic energy of a constant frequency. The chamber is made to be resonant to the frequency or wavelength output of the transducer 76 by varying the lenght of the chamber, as by moving a plunger 78 by means of a motor 80. A microphone 82 enables sensing the intensity of the acoustic energy in the chamber, to enable control of chaber length so it is at a center resonant length (i.e., at a length where the frequency of the transducer output is at a center resonant frequency). The microphone is preferably located near a pressure maximum for the mode that is applied. With the chamber at a resonant length, the object 72 will be urged towards an equilibrium position, which the apparatus can be used to determine. Such a determination may be difficult, because a heating coil 84 may be used to heat the middle of the chamber where the object 72 lies, and the wavelength of acoustic energy may very as indicated at 86, with the wavelength being shorter at the opposite ends of the chamber where the gaseous fluid in the chamber is cooler, than at the middle where the fluid is hotter.

Applicant determines the equilibrium position of the object 72 by the use of an apparatus 88 that enables the object to be established at a plurality of different positions in the chamber, which are all genarally near a predicted equilibrium position. At each position of the object, the length L of the chamber is altered until the center resonant length of the chamber is determined for that object location (i.e., the chamber is of a length where the output of the transducer is a center resonant frequency). The object is moved to another position and the center resonant length of the chamber is again determined. This is continued for a chamber of object positions. That object position which results in the longest resonant chamber length, is the equilibrium position of the object, or in other words, the position at which the object will be positioned in a zero gravity environment, for the given transducer frequency output and with the length of the chamber adjusted to be at the center resonant frequency and with the object present. The test may be conducted with the heating coils 84 energized, and at least some of the fluid in the chamber heated to over 1000° C. to simulate actual conditions in a spacecrafter.

The orientation that a nonspherical object will achieve in the chamber 74 of FIG. 5 can be determined by establishing the object in a plurality of different orientations, determining the center resonant chamber length for each orientation, and choosing the center resonant length which is the longest. The object will become oriented at that orientation which results in the longest center resonant length of the chamber. In a way similar to that described above in connection with FIGS. 1-4, the relative force urging the object 72 of FIG. 5 towards its equilibrium position, and the relative torque urging the object towards its equilibrium orientation can be determined by determining the change in resonant chamber length with change in object position or orientation, and by determining the derivative of the change.

FIG. 6 is a flow diagram 100 which describes the operation of the control circuit 46 of FIG. 1. As discussed above, the control circiut 46 determines the center resonant frequency for each of several object positions, in order to enable a person to determine which object position resulted in the lowest resonant frequency (that being the equilibrium position of the object). In the diagram 100 a first step 102 is to energize the transducer 20 of FIG. 1 at a frequency F which has been previously calculated to be close to the center resonant frequency for the chosen positioning mode. The next step 104 is to measure the quantity M which is the relative output of the microphone 44. The next step 106 is to apply a new frequency equal to the previous frequency F plus a slight positive increment F. In step 108, the circuit measures the new M which is the microphone output. A next step 110 is to compare the new microphone output M derived in step 108, with the previous output M derived in step 104. If the new M is greater than or equal to the previous M, the next step is 112, which is to repeat the steps 106–112, with the frequency F increasing during each repeat.

If, in step 110, it is determined that the new M is less than the previous M, the next step 114 is to decrease the previous F by an increment ΔF. At step 116 the microphone output M is measured, while in step 118 the new microphone output M is compared to the previous microphone output. If the new microphone output M is less than or equal to the previous output, then the process continues with step 120, which is to repeat the sequence of steps 114–120. However, if, at step 118, the new microphone output M is greater than or equal to the previous M, then at step 122 the last frequency F is recorded. The frequency recorded in step 122 is the center resonant frequency for that object position. The process indicated by diagram 100 is repeated for each object position. It is possible to merely record on a screen or printout, the center resonant frequencies of the object positions. It is also possible to provide a circuit that, after the last position, automatically indicates which position resulted in the lowest center resonant frequency, to thereby determine the equilibrium position of the object.

FIG. 7 is a diagram 130 for the control 90 of FIG. 5. The diagram 130 is similar to the diagram of FIG. 6, except that instead of changing the frequency F, the diagram process to change the chamber length L by an increment ΔL and measures the resulting change in microphone output. The first change in L is indicated at step 132. The last step 134 in the process is to record the center resonant length of the chamber for a given object position within the chamber. The center resonant lengths are recorded for each of the plurality of positions at which the object is established. The center position which results in the longest center resonant length of the chamber can be determined manually or automatically.

The same control circuit operated in accordance with the diagrams of FIG. 6 of FIG. 7, can be used to determine the equilibrium orientation of the object.

The above methods for determining object position, orientation, restoring forces, and torques can be used to determined changes in them resulting from a change in any of a wide variety of variables. Such variables include changes in the porosity, elasticity, shape, or other acoustic impedance characteristics of the chamber walls and of the object, as well as changes in the fluid in the chamber. The term "acoustic impedance characteristic" as applied to an object to be acoustically levitated or to a sound reflecting wall of a chamber, refers to a characteristic (porosity, elasticity, shape, etc.) of the object or wall that affects the acoustic impedance (reflectiveness and/or absorbability) of the object or wall, but does not refer to the position or orientation of such object or wall.

Thus, the invention provides a method and apparatus for determining the position and orientation of an object in an acoustic resonant standing wave field under zero or microgravity conditions, without the need for the detemination to be made in such a microgravity environment. The system also enables a determination of the relative force and torque urging the object toward its equilibrium position and orientation. The method and apparatus can be used with systems where the frequency of the acoustic energy can be varied, as well in systems where a dimension such as the length of a chamber can be varied. The method involves holding the object at each of a plurality of different positions and/or orientations, and determining the center resonant frequency or center resonant length for each position or orientation. The equilibrium position and orientation is that which results in the lowest center resonant frequency or longest resonant chamber dimension. The method and apparatus are applicable to a wide variety of chamber types, including those where the chamber includes a pair of opposing reflecting walls and is largely open, as well closed chambers of a variety of shapes and where the chambers and objects may be of irregular shape.

Although particular embodiments of the invention have been described and illustrated herein, it is recognized that modifications and variations may readily occur to those skilled in the art and consequently it is intended to cover such modifications and equivalents.

We claim:

1. A method for determining the equilibrium position in a zero gravity environment of an object in an acoustic standing wave field of given mode, where the acoustic field is other than a simple plane wave field, comprising:

establishing an acoustic standing wave field of given mode, and establishing said object in a plurality of different positions in said field;

experimentally determining the center resonant frequency of said mode at each of said positions, including determining at which of said positions the center resonant frequency is lowest, to thereby determine the equilibrium position of said object in said field, which is the position at which the center resonant frequency was lowest.

2. The method described in claim 1 wherein:

said step of establishing includes holding said object in each of said positions within a chamber;

said step of determining includes driving a transducer coupled to said chamber, sequentially at a plurality of different frequencies, when said object is in each of said positions, and sensing the pressure of the acoustic energy at each of said frequencies including noting the frequency at which the acoustic pressure is a maximum for that object position, and noting the position at which the frequency of maximum pressure is lowest.

3. The method described in claim 1 including:

determining the rate of change of resonant frequency with position near the position at which the resonant frequency is lowest, whereby to determine the acoustic positioning force thereat urging the object toward the equilibrium position.

4. The method described in claim 1 including:

establishing said object in a plurality of different orientations in said field, while the object lies substantially at said position at which the center resonant frequency is lowest;

determining the center resonant frequency of said mode at each of said orientations, including determining at which of said orientations the center resonant frequency is lowest, whereby to determine the equilibrium orientation of the object.

5. The method described in claim 1 wherein:

said step of establishing includes holding said object in a chamber having walls; and including changing and acoustic impedance characteristic of the chamber walls and determining the object position resulting in the lowest center resonant frequency after the change.

6. A method for determining the orientation that an object will assume in a zero gravity environment, in an acoustic standing wave field of given mode, comprising:

establishing an acoustic standing wave field of given mode, and establishing said object in plurality of different orientations substantially at an equilibrium position of the object;

experimentally determining the center resonant frequancy of said mode at each of said orientations, including determining at which of said orientations the frequency of the center resonant frequency is lowest, to thereby determine the orientation that said object will assume in said field which is the orientation at which the center resonant frequency was lowest.

7. The method described in claim 6 wherein:

said step of establishing includes holding said object in each of said orientations within a chamber;

said step of determining includes driving a transducer coupled to said chamber, at a plurality of frequencies of said mode, when said objects is in each of said orientations, and sensing the intensity of acoustic energy at each of said frequencies including noting the frequency at which the acoustic pressure is a maximum for that object orientation, and noting the orientation at which the frequency of maximum pressure is lowest.

8. The method described in claim 6 including:

determining the rate of change of resonant frequency with change of orientation near the orientation at which the resonant frequency is lowest, whereby to determine the acoustic orienting torque thereat urging the object toward the orientation at which the resonant frequency is lowest.

9. The method described in claim 6 including:

changing an acoustic impedance characteristic of said object and determining the object orientation resulting in the lowest center resonant frequency after the change.

10. A method for determining the equilibrium position in a zero gravity environment of an object lying in a chamber which has a variable dimension, while an acoustic standing wave field of given mode and frequency is applied to the chamber, comprising:

establishing a standing wave field of given mode and frequency in said chamber, and establishing said object in a plurality of different positions in said field and varying the chamber dimension at each object position;

experimentally determining the resonant dimension of said chamber, at which said given frequency is a center resonant frequency, at each of said object positions, and determining at which object position the resonant dimension is greatest, to thereby determine the equilibrium position of said object in said field, which is the position at which the resonant dimension was greatest.

11. The method described in claim 10 wherein:

said chamber has an axis, said variable dimension is the length of said chamber and the length extends substantially along said axis, and the equilibrium position of said object is substantially along said axis;

said step of detemining the resonant dimension includes energizing an acoustic transducer coupled to said chamber at a constant energization level, sensing the variation in the pressure of the acoustic field in said chamber while varying the length of said chamber, and determining the length at which the pressure of said acoustic field is greatest.

12. The method described in claim 10 including:

measuring the rate of change of resonant dimension of said chamber with change in object position near the position at which the resonant dimension is greatest, whereby to determine the acoustic positioning force thereat urging the object toward the equilibrium position.

13. The method described in claim 10 including:

establishing said object in a plurality of different orientations at substantially said object position at which the resonant dimension is greatest;

determining at which of said orientations the resonant dimension of the chamber is greatest, whereby to determine the equilibrium orientation of the object.

14. The method described in claim 10 wherein:

said chamber contains a fluid, and including heating the fluid around said object to a temperature of at least 1000° C. while increasing said chamber dimension to maintain an acoustic standing wave field in the chamber, and said step of determining the resonant dimension at each object postion is performed after said temperature reaches at least 1000°C.

15. A method for determining the orientation that an object will assume in a zero gravity environment while lying substantially at an equilibrium position in an acoustic standing wave field that is present in a chamber which has a variable length, where the acoustic standing wave field is of given mode and frequency, comprising:

establishing a standing wave field of given mode and frequency in said chamber, and establishing said object in a plurality of different orientations while it lies substantially at said equilibrium position;

experimentally determining the resonant dimension of said chamber, at which said given frequency is a resonant frequency, at each of said object orientations, and determining at which object orientation the resonant dimension of said chamber is greatest, to thereby determine the orientation that said object will assume in said field, which is the orientation at which the resonant dimension of said chamber was greatest.

16. Apparatus for determining the equilibrium position, in a zero gravity environment, of an object in an acoustic standing wave field of given mode and frequency, comprising:

walls forming a chamber, which includes at least two sound reflecting walls;

a variable frequency acoustic transducer device coupled to said chamber to establish said acoustic standing wave field therein of a predetermined mode, said transducer device being constructed to generate an acoustic field that levitates said object in three dimension;

a solid device that extends from substantially said chamber walls to said object and that can apply force to said object to move it in either of two opposite directions along at least two perpendicular directions and that can hold said object at a position to which it is moved in the presence of said acoustic field;

a device that measures the pressure of the acoustic field in said chamber.

17. Apparatus for determining the orientation that an object will assume in a zero gravity environment, near an equilibrium position in an acoustic standing wave field of given mode, comprising:

walls forming a chamber, which includes at least two sound reflecting walls;

a variable frequency acoustic transducer device coupled to said chamber to establish said acoustic standing wave field therein of a predetermined mode;

a solid device that extends from substantially said chamber walls to said object and that can rotate said objects and hold the object at the orientation to which it is rotated in the presence of said acoustic field;

a device that measures the relative pressure of the acoustic field in said chamber.

18. The method described in claim 1 wherein:

of said object and chamber, at least one of them in non-spherical;

said steps of establishing and determining are performed while said object is in an environment of approximately one G.

19.The method described in claim 6 wherein:

said object is non-spherical;

said steps of establishing and determining are performed while said object is in an environment of approximately one G.

20. A method for determining the equilibrium position in a microgravity environment of a non-spherical object in a chamber containing an acoustic standing wave field of given mode, where the field is other than a simple plane wave field, comprising:

establishing said object in at least three different positions in said field wherein said positions are spaced from each other in at least two dimensions, and applying acoustic energy of approximately said mode to said chamber, while said object is in an approximately one G environment;

varying the frequency of the applied acoustic energy while said object is at each of said positions, until the center resonant frequency is obtained for the object at each of said positions, and determining which of said center resonant frequencies is lèast, to thereby determine the equilibrium position of said object in said field, which is the position at which the center resonant frequency is least.

* * * * *